(12) United States Patent
Kashiwakura et al.

(10) Patent No.: US 12,743,958 B2
(45) Date of Patent: Sep. 22, 2026

(54) METHOD FOR MONITORING VEHICLES

(71) Applicant: TOYOTA JIDOSHA KABUSHIKI KAISHA, Toyota (JP)

(72) Inventors: Toshiki Kashiwakura, Tokyo-to (JP); Chihiro Inaba, Tokyo-to (JP); Shoi Suzuki, Tokyo-to (JP); Tsuyoshi Okada, Nagoya (JP); Yasuhiro Kobatake, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 15 days.

(21) Appl. No.: 19/001,478

(22) Filed: Dec. 25, 2024

(65) Prior Publication Data

US 2025/0218300 A1 Jul. 3, 2025

(30) Foreign Application Priority Data

Dec. 28, 2023 (JP) ................................ 2023-223326

(51) Int. Cl.

*G08G 1/00* (2006.01)
*G06V 20/54* (2022.01)
*G08G 1/01* (2006.01)
*H04W 4/44* (2018.01)

(52) U.S. Cl.

CPC ............ *G08G 1/207* (2013.01); *G06V 20/54* (2022.01); *G08G 1/0116* (2013.01); *H04W 4/44* (2018.02)

(58) Field of Classification Search

CPC .... G06V 20/54; G08G 1/0116; G08G 1/0133; G08G 1/04; G08G 1/042; G08G 1/096725; G08G 1/096783; G08G 1/0969; G08G 1/164; G08G 1/166; G08G 1/207; H04W 4/44

See application file for complete search history.

(56) References Cited

U.S. PATENT DOCUMENTS

2012/0206483 A1* 8/2012 Funabashi ........ G08G 1/096783 345/629
2012/0242505 A1* 9/2012 Maeda ............ G08G 1/096783 340/905
2018/0144623 A1* 5/2018 Shirakata ........... G08G 1/09675
2020/0098254 A1* 3/2020 Oyabu ..................... H04B 7/06
2020/0278212 A1* 9/2020 Matsumoto .......... G08G 1/0116
2020/0342767 A1* 10/2020 Nguyen ............... G08G 1/0116
2023/0162606 A1* 5/2023 Sakamoto ............. G16Y 10/40 340/937

FOREIGN PATENT DOCUMENTS

JP 2023050629 A 4/2023
JP 2024093630 A 7/2024

* cited by examiner

*Primary Examiner* — Blake A Wood
(74) *Attorney, Agent, or Firm* — KENJA IP LAW PC

(57) ABSTRACT

A method executed by a computer capable of communicating with one or more automated driving vehicles and one or more roadside apparatuses includes storing information indicating an installation position and a detection area of each of the road side apparatuses, monitoring positional information for each of the automated driving vehicles, displaying a map screen, and displaying the automated driving vehicles and the roadside apparatuses on the map screen in a first mode when the automated driving vehicles enter detection areas of the roadside apparatuses.

6 Claims, 5 Drawing Sheets

1
30
INFORMATION PROCESSING APPARATUS
40
20
ROADSIDE APPARATUS
10
VEHICLE

METHOD FOR MONITORING VEHICLES

CROSS-REFERENCE TO RELATED APPLICATION

This application claims priority to Japanese Patent Application No. 2023-223326 filed on Dec. 28, 2023, the entire contents of which are incorporated herein by reference.

TECHNICAL FIELD

The present disclosure relates to a method.

BACKGROUND

Technology for monitoring vehicles with communication functions is known. For example, Patent Literature (PTL) 1 discloses a notification system that, according to the behavior of an automated driving vehicle scheduled to pass through a predetermined traffic area, notifies vehicles other than the automated driving vehicle, pedestrians, or the like of traffic availability and alerts.

CITATION LIST

Patent Literature

PTL 1: JP 2023-050629 A

SUMMARY

Improvement in technology for monitoring vehicles with communication functions is desired.

It would be helpful to improve technology for monitoring vehicles with communication functions.

A method according to an embodiment of the present disclosure is a method executed by a computer capable of communicating with one or more automated driving vehicles and one or more roadside apparatuses, the method including:

- storing information indicating an installation position and a detection area of each of the road side apparatuses;
- monitoring positional information for each of the automated driving vehicles;
- displaying a map screen; and
- displaying the automated driving vehicles and the roadside apparatuses on the map screen in a first mode when the automated driving vehicles enter detection areas of the roadside apparatuses.

According to an embodiment of the present disclosure, technology for monitoring vehicles with communication functions is improved.

DETAILED DESCRIPTION

Hereinafter, an embodiment of the present disclosure will be described.

Outline of Embodiment

Figure 1:
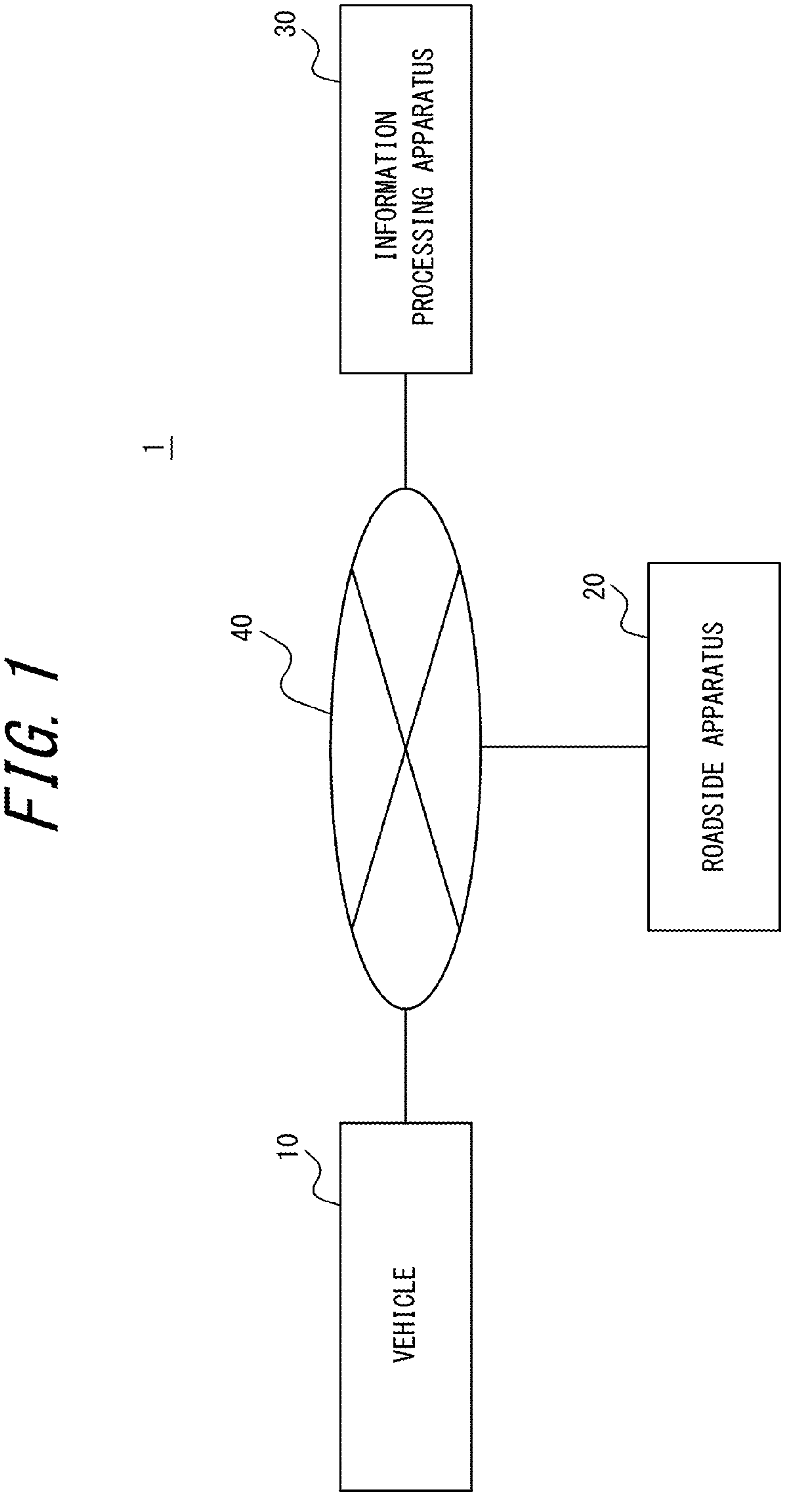
FIG. 1 is a block diagram illustrating a schematic configuration of a system according to an embodiment of the present disclosure.

An outline of a system 1 according to the embodiment of the present disclosure will be described with reference to FIG. 1. The system 1 includes one or more vehicles 10, one or more roadside apparatuses 20, and an information processing apparatus 30. The vehicle 10, the roadside apparatus 20, and the information processing apparatus 30 are communicably connected to a network 40 including, for example, a mobile communication network, the Internet, or the like.

The vehicle 10 is, for example, a gasoline automobile, a battery electric vehicle (BEV), a hybrid electric vehicle (HEV), a plug-in hybrid electric vehicle (PHEV), a fuel cell electric vehicle (FCEV), or the like, but is not limited to these, and may be any automobile that people can board. The vehicle 10 may be an automated driving vehicle capable of automated driving such as any one of Level 1 to Level 5 as defined by the Society of Automotive Engineers (SAE), for example. In the present embodiment, the vehicle 10 is capable of automated driving at Level 3 or 4, and the driving assistant can override driving operations on board the vehicle 10 or remotely. The system 1 may include any number of one or more vehicles 10.

The roadside apparatus 20 is installed in the vicinity of, for example, an intersection, a crosswalk, or the like. In the present embodiment, the roadside apparatus 20 can detect, from video of a camera provided therein, pedestrians heading toward a roadway, as pedestrians who are about to cross the roadway. The roadside apparatus 20 has a predefined detection area around the roadside apparatus 20, for example. Upon detecting a pedestrian attempting to cross the roadway, the roadside apparatus 20 notifies the pedestrian of the presence or absence of the vehicle 10 (e.g., the vehicle 10 approaching the roadside apparatus 20) that has entered the detection area of the roadside apparatus 20. Upon detecting a pedestrian attempting to cross the roadway, the roadside apparatus 20 notifies the driver or driving assistant of the vehicle 10 that has entered the detection area of the roadside apparatus 20, of the presence of the pedestrian. The system 1 may include any number of one or more roadside apparatuses 20.

The information processing apparatus 30 is one computer or a plurality of computers that can communicate with each other. The information processing apparatus 30 is used to monitor each vehicle 10 by communicating with each vehicle 10 and each roadside apparatus 20. In the present embodiment, the information processing apparatus 30 is used, for example, by the operator of a control center.

First, an outline of the present embodiment will be described, and details thereof will be described later. The information processing apparatus 30 stores information indicating the installation position and the detection area of each roadside apparatus. The information processing apparatus 30 monitors the positional information for each vehicle 10. The information processing apparatus 30 displays a map screen. When the vehicle 10 enters the detection area of the roadside apparatus 20, the information processing apparatus 30 displays the vehicle 10 and the roadside apparatus 20 on the map screen in the first mode.

Figure 2:
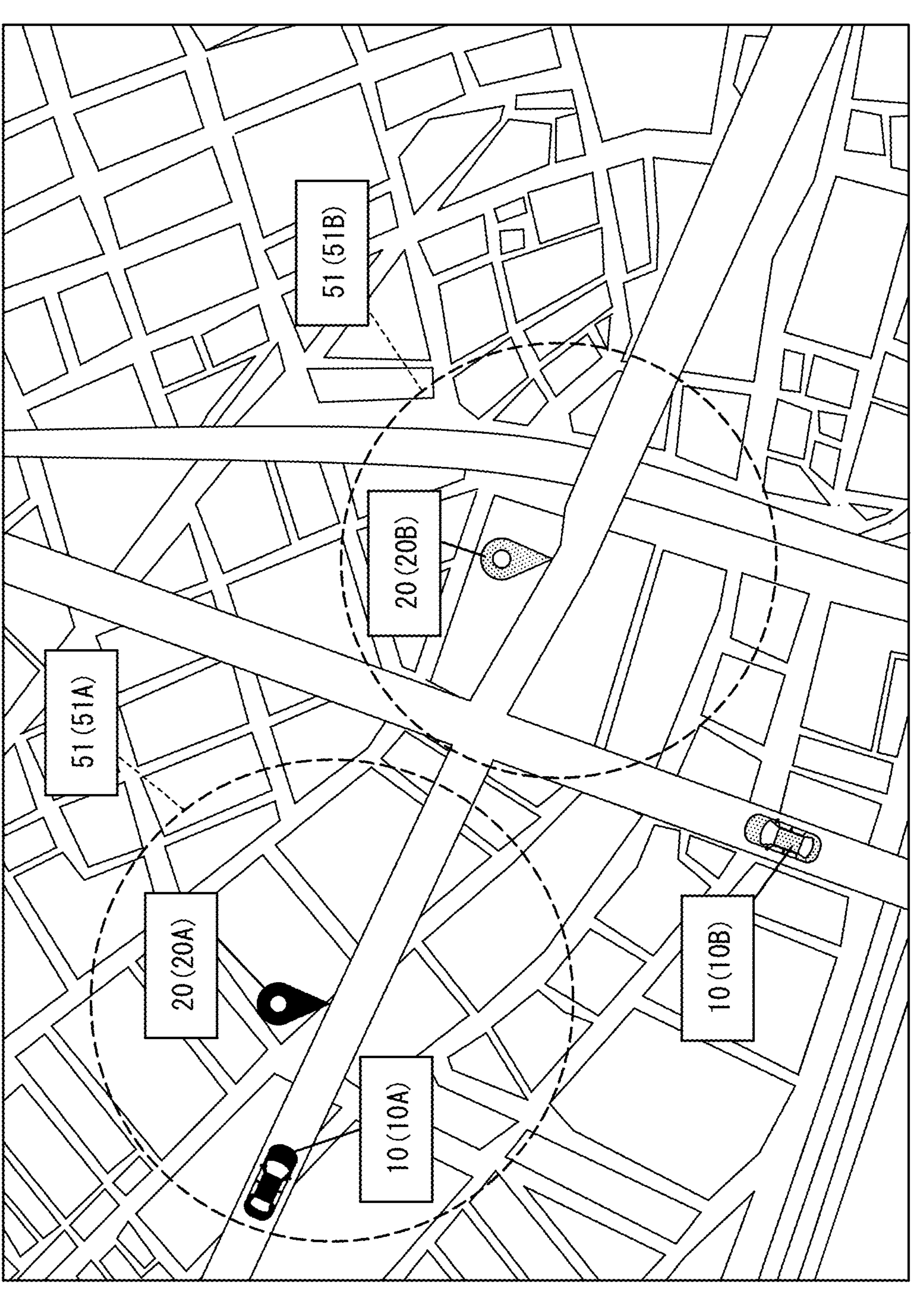
FIG. 2 is a diagram illustrating an overview of a map screen displayed by an information processing apparatus.

Here, with reference to FIG. 2, an overview of a map screen 50 displayed by the information processing apparatus 30 will be described. In the example illustrated in FIG. 2, a roadside apparatus 20A and a vehicle 10A that has entered a detection area 51A of the roadside apparatus 20A are displayed in the first mode on the map screen 50. As described below, a roadside apparatus 20B, for which none of the vehicles 10 (10A, 10B) have entered a detection area 51B of the roadside apparatus 20B, and the vehicle 10B, which has not entered the detection area 51 (51A, 51B) of any of the roadside apparatuses 20 (20A, 20B), may be displayed on the map screen 50 in a second mode distinguishable from the first mode.

Thus, according to the present embodiment, when a specific situation occurs that the vehicle 10 has entered the detection area 51 of the roadside apparatus 20, the vehicle 10 and the roadside apparatus 20 are displayed on the map screen 50 in the first mode. Thus, an operator using the information processing apparatus 30 can recognize at a glance the vehicle 10 and the roadside apparatus 20 in this particular situation. Thus, according to the present embodiment, the technology for monitoring vehicles with communication functions is improved in that the operator can monitor the status of the vehicles more efficiently compared to, for example, an example in which all vehicles 10 and all roadside apparatuses 20 are displayed on the map screen 50 at all times.

Next, configurations of the system 1 will be described in detail.

Configuration of Vehicle

Figure 3:
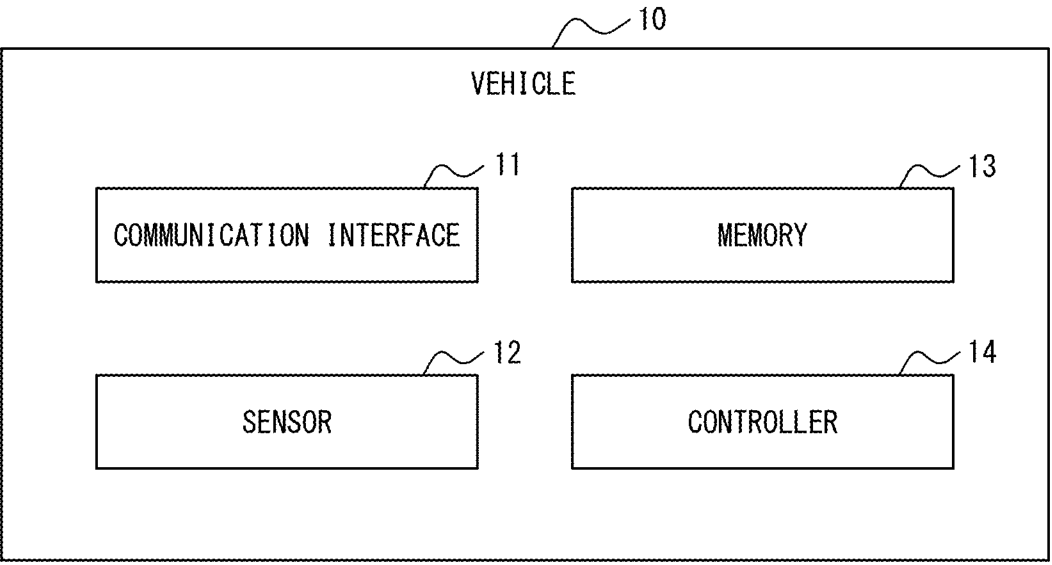
FIG. 3 is a block diagram illustrating a schematic configuration of a vehicle.

As illustrated in FIG. 3, the vehicle 10 includes a communication interface 11, a sensor 12, a memory 13, and a controller 14.

The communication interface 11 includes at least one communication interface for connecting to the network 40. The communication interface is compliant with mobile communication standards such as the 4th generation (4G) standard and the 5th generation (5G) standard, for example, but not limited to these, and may be compliant with any communication standard. In the present embodiment, the vehicle 10 communicates with the information processing apparatus 30 via the communication interface 11 and the network 40.

The sensor 12 includes one or more sensors used to control the vehicle 10. The sensors are, for example, position sensors corresponding to a global positioning system (GPS) or the like, geomagnetic sensors, velocity sensors, acceleration sensors, gyro sensors, or the like, but are not limited to these and may be any sensor.

The memory 13 includes one or more memories. In the present embodiment, the "memories" are semiconductor memories, magnetic memories, optical memories, or the like, for example, but are not limited to these. The memories included in the memory 13 may each function as, for example, a main memory, an auxiliary memory, or a cache memory. The memory 13 stores any information to be used for operations of the vehicle 10. For example, the memory 13 may store a system program, an application program, embedded software, and the like. The information stored in the memory 13 may be updated with, for example, information acquired from the network 40 via the communication interface 11.

The controller 14 includes at least one processor, at least one programmable circuit, at least one dedicated circuit, or a combination of these. The processor is a general purpose processor such as a central processing unit (CPU) or a graphics processing unit (GPU), or a dedicated processor that is dedicated to specific processing, for example, but is not limited to these. The programmable circuit is a field-programmable gate array (FPGA), for example, but is not limited to this. The dedicated circuit is an application specific integrated circuit (ASIC), for example, but is not limited to this. The controller 14 controls the operations of the entire vehicle 10.

For example, in the present embodiment, the controller 14 transmits the positional information for the vehicle 10 detected by the sensor 12 to the information processing apparatus 30 via the communication interface 11. Transmission of positional information may be performed, for example, periodically or whenever a predetermined event occurs. The controller 14 may also transmit the route information to the information processing apparatus 30, for example, when the vehicle is traveling according to route information indicating the searched travel route.

(Configuration of Roadside Apparatus)

Figure 4:
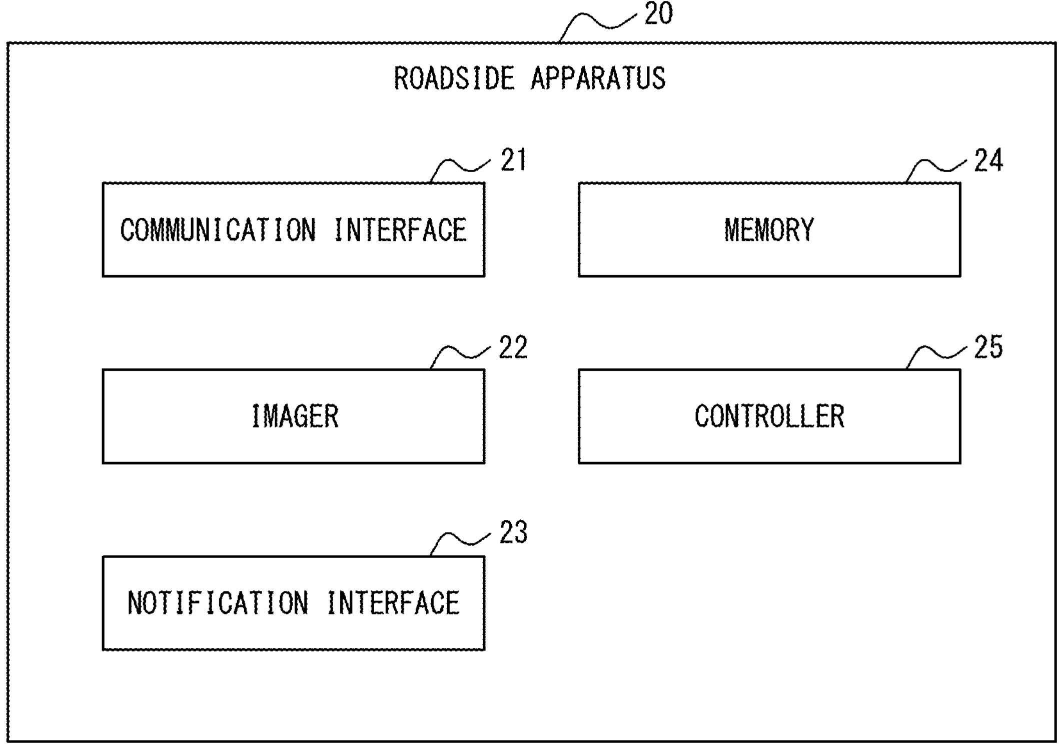
FIG. 4 is a block diagram illustrating a schematic configuration of a roadside apparatus.

As illustrated in FIG. 4, the roadside apparatus 20 includes a communication interface 21, an imager 22, a notification interface 23, a memory 24, and a controller 25.

The communication interface 21 includes at least one communication interface for connecting to the network 40. The communication interface is compliant with, for example, a mobile communication standard or a wireless local area network (LAN) standard, but not limited to these and may be compliant with any communication standard. In the present embodiment, the roadside apparatus 20 communicates with the information processing apparatus 30 via the communication interface 21 and the network 40.

The imager 22 includes one or more cameras that can image its surroundings. In the present embodiment, the roadside apparatus 20 is installed in the vicinity of the boundary between a sidewalk and a roadway, for example, so that the imager 22 can image pedestrians moving from the sidewalk toward the roadway.

The notification interface 23 includes one or more notification devices that notify pedestrians nearby of information. The notification devices are, for example, speakers, electronic bulletin boards, displays, or the like, but are not limited to these and may be any notification devices.

The memory 24 includes one or more memories. The memories included in the memory 24 may each function as, for example, a main memory, an auxiliary memory, or a cache memory. The memory 24 stores any information to be used for operations of the roadside apparatus 20. For example, the memory 24 may store a system program, an application program, embedded software, or the like. The information stored in the memory 24 may be updated with, for example, information acquired from the network 40 via the communication interface 21.

The controller 25 includes at least one processor, at least one programmable circuit, at least one dedicated circuit, or a combination of these. The controller 25 controls operations of the entire roadside apparatus 20.

For example, in the present embodiment, upon detecting a pedestrian heading toward the roadway from the video of the imager 22 by image recognition, the controller 25 transmits to the information processing apparatus 30 via the communication interface 21, the identification information of the roadside apparatus 20 and information inquiring whether the vehicle 10 has entered the detection area 51 of the roadside apparatus 20. Upon receiving information from the information processing apparatus 30 indicating, for example, the presence or absence of the vehicle 10 having entered the detection area 51 of the roadside apparatus 20, the controller 25 notifies the relevant pedestrian heading toward the roadway of the predetermined information. The predetermined information may include, but is not limited to, messages indicating, for example, whether the approaching vehicle 10 is present, but may be any information.

(Configuration of Information Processing Apparatus)

Figure 5:
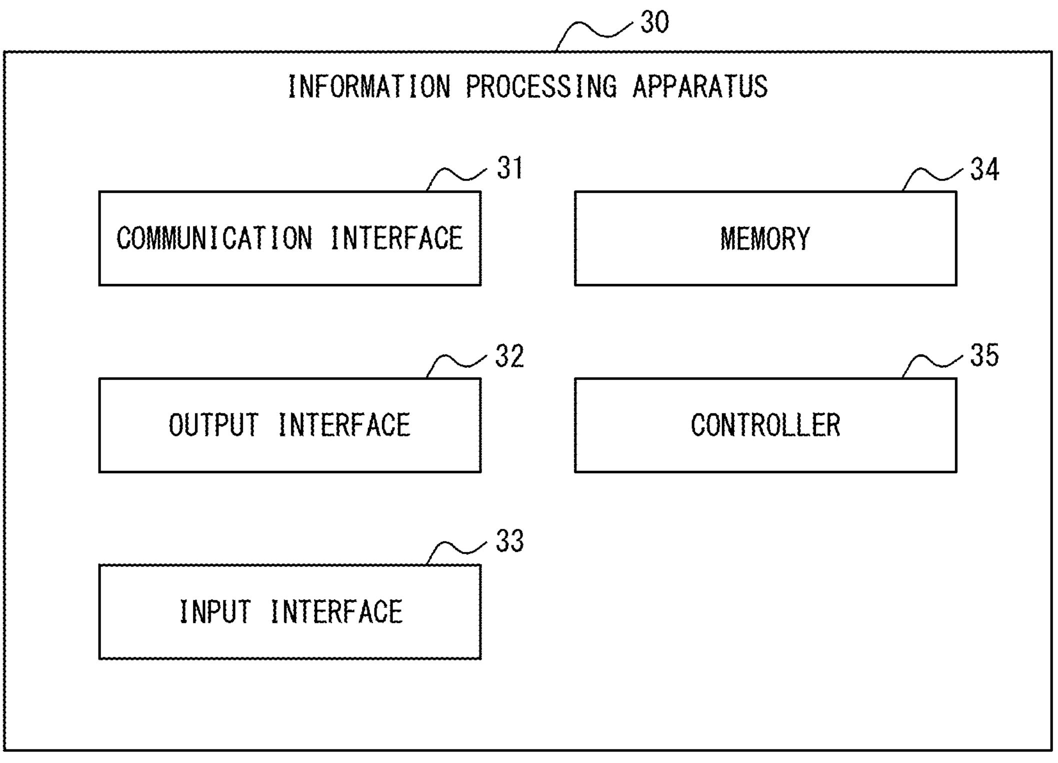
FIG. 5 is a block diagram illustrating a schematic configuration of the information processing apparatus.

As illustrated in FIG. 5, the information processing apparatus 30 includes a communication interface 31, an output interface 32, an input interface 33, a memory 34, and a controller 35.

The communication interface 31 includes at least one communication interface for connecting to the network 40. The communication interface is compliant with a wired LAN standard or a wireless LAN standard, for example, but is not limited to these, and may be compliant with any communication standard. In the present embodiment, the information processing apparatus 30 communicates with the vehicle 10 and the roadside apparatus 20 via the communication interface 31 and the network 40.

The output interface 32 includes one or more output apparatuses for outputting information. The output apparatus is a display for outputting information as video, a speaker for outputting information as audio, or the like, for example, but is not limited to these. Alternatively, the output interface 32 may include an output interface for outputting information via an external output apparatus.

The input interface 33 includes at least one input apparatus for detecting user input. The input apparatus is a physical key, a capacitive key, a pointing device such as a mouse, a touch screen integrally provided with a display of the output interface 32, a microphone for accepting audio input, or the like, for example, but is not limited to these. Alternatively, the input interface 33 may include an input interface for detecting user input via an external input apparatus.

The memory 34 includes one or more memories. The memories included in the memory 34 may each function as, for example, a main memory, an auxiliary memory, or a cache memory. The memory 34 stores any information to be used for operations of the information processing apparatus 30. For example, the memory 34 may store a system program, an application program, embedded software, or the like. In the present embodiment, the memory 34 stores map information, route information for each vehicle 10, and information indicating the installation position and the detection area 51 of each roadside apparatus 20.

The controller 35 includes at least one processor, at least one programmable circuit, at least one dedicated circuit, or a combination of these. The controller 35 controls operations of the entire information processing apparatus 30.

For example, in the present embodiment, the controller 35 receives, via the communication interface 31, from the roadside apparatus 20 that detected the pedestrian heading toward the roadway, identification information of the roadside apparatus 20 and information inquiring whether or not the vehicle 10 has entered the detection area 51 of the roadside apparatus 20. The controller 35 determines whether the vehicle 10 has entered the detection area 51 of the roadside apparatus 20 based on the installation position of the roadside apparatus 20 and the positional information for each vehicle 10. The controller 35 then transmits the information indicating the determination result to the roadside apparatus 20. When the vehicle 10 entering the detection area 51 of the roadside apparatus 20 is detected, the controller 35 transmits to the detected vehicle 10 (or the terminal apparatus of the driver or driving assistant of the vehicle 10) information indicating the installation position the roadside apparatus 20 and the presence of a pedestrian heading toward the roadway.

Other operations of the information processing apparatus 30 according to the present embodiment will be described later.

(Flow of Operations of Information Processing Apparatus)

Figure 6:
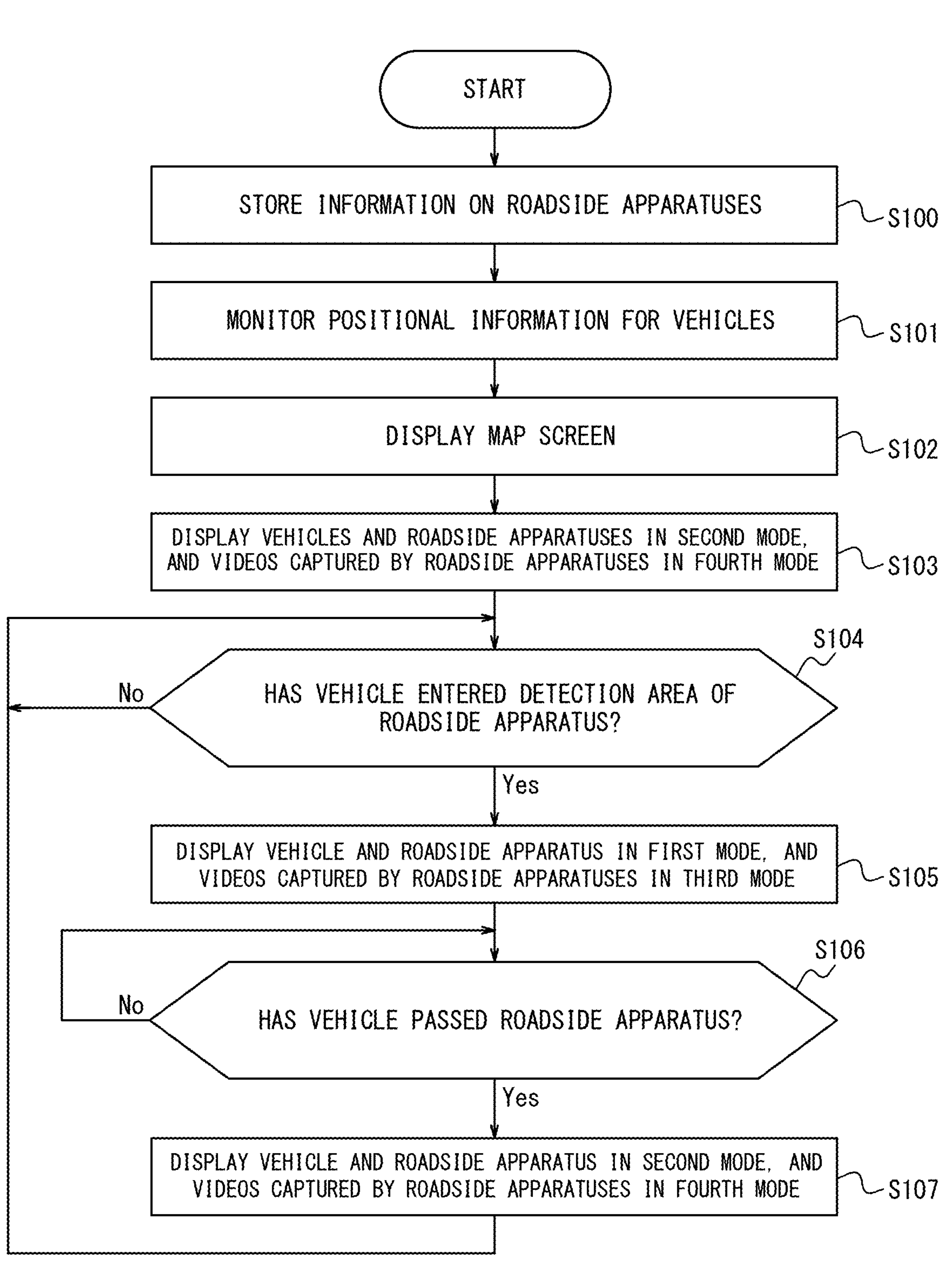
FIG. 6 is a flowchart illustrating operations of the information processing apparatus.

The flow of operations of the information processing apparatus 30 is described with reference to FIG. 6.

S100: The controller 35 of the information processing apparatus 30 stores information indicating the installation position and the detection area 51 of each roadside apparatus 20 in the memory 34.

The installation position and the detection area 51 of each roadside apparatus 20 may be defined freely. In an example, the roadside apparatus 20 is installed near an intersection, a crosswalk, or an obstacle that tends to create a blind spot from the vehicle 10, but the installation position of the roadside apparatus 20 is not limited to this example and can be determined freely. In an example, the detection area 51 is a circular area with a predetermined radius centered on the installation position of the roadside apparatus 20, but the shape of the detection area 51 is not limited to this example and can be determined freely.

S101: The controller 35 monitors the positional information for each vehicle 10.

Specifically, the controller 35 monitors the positional information for each vehicle 10 by periodically receiving the positional information for the vehicle 10 from each vehicle 10 as described above.

S102: The controller 35 displays the map screen 50 on the display of the output interface 32.

The area displayed on the map screen 50 may be movable, expandable, and contractible, for example, in response to operator input via the input interface 33.

S103: The controller 35 displays each vehicle 10 and each roadside apparatus 20 on the map screen 50 in a second mode.

As described below, the operator can distinguish between the first mode and the second mode on the map screen 50.

S104: The controller 35 determines whether the vehicle 10 has entered the detection area 51 of the roadside apparatus 20. When it is determined that the vehicle 10 has entered the detection area 51 of the roadside apparatus 20 (S104—Yes), the process proceeds to S105. On the other hand, when it is determined that the vehicle 10 has not entered the detection area 51 of the roadside apparatus 20 (S103—No), the process repeats S104.

In detail, S104 is executed when the controller 35 receives, via the communication interface 31, from the roadside apparatus 20 that detected the pedestrian heading toward the roadway, identification information of the roadside apparatus 20 and information inquiring whether the vehicle 10 has entered the detection area 51 of the roadside apparatus 20.

Specifically, the controller 35 identifies each vehicle 10 approaching the roadside apparatus 20 based on the positional information or route information for each vehicle 10. The controller 35 identifies each vehicle 10 that has entered the detection area 51 of the roadside apparatus 20 based on the positional information for each vehicle 10 identified. Here, the "vehicle 10 that has entered the detection area 51" refers to the vehicle 10 that has traveled from outside to inside the detection area 51, but is not limited to this and may include, for example, the vehicle 10 that is inside the detection area 51 and approaching the roadside apparatus 20.

S105: If it is determined in S104 that the vehicle 10 has entered the detection area 51 of the roadside apparatus 20 (S104—Yes), the controller 35 displays the vehicle 10 and the roadside apparatus 20 in the first mode on the map screen 50.

In the present embodiment, each vehicle 10 and each roadside apparatus 20 are displayed in the second mode in S103 described above, and when the vehicle 10 enters the detection area 51 of the roadside apparatus 20, the display mode for the vehicle 10 and the roadside apparatus 20 is switched from the second mode to the first mode. The vehicle 10 and the roadside apparatus 20 displayed in the first mode may be preferentially visible by the operator compared to the vehicle 10 and the roadside apparatus 20 displayed in the second mode. Specifically, the second mode is a mode in which the target vehicle 10 and roadside apparatus 20 are simply displayed, for example, whereas the first mode may be a mode in which the target vehicle 10 and roadside apparatus 20 are displayed more emphatically than the second mode, such as by making them flicker. For example, in the map screen 50 illustrated in FIG. 2, the vehicle 10A and the roadside apparatus 20A are displayed in the first mode, and the vehicle 10B and the roadside apparatus 20B are displayed in the second mode. Thus, the operator can preferentially see the vehicle 10A and the roadside apparatus 20A.

S106: The controller 35 determines whether the vehicle 10 has passed the roadside apparatus 20. When it is determined that the vehicle 10 has passed the roadside apparatus 20 (S106—Yes), the process proceeds to S107. On the other hand, when it is determined that the vehicle 10 has not passed the roadside apparatus 20 (S106—No), the process repeats S106.

Specifically, the controller 35 identifies whether the vehicle 10 has passed the roadside apparatus 20 based on the positional information for the vehicle 10 that has entered the detection area 51 of the roadside apparatus 20. Here, "the vehicle 10 has passed the roadside apparatus 20" means that vehicle 10 has passed the roadside apparatus 20 inside the detection area 51, but is not limited to this and may include, for example, the vehicle 10 traveling from inside to outside the detection area 51.

S107: If it is determined in S106 that the vehicle 10 has passed the roadside apparatus 20 (S106—Yes), the controller 35 displays the vehicle 10 and the roadside apparatus 20 in a second mode on the map screen 50. The process subsequently returns to S104.

In the present embodiment, the vehicle 10 and the roadside apparatus 20 are displayed in the first mode in S105 above, and when the vehicle 10 has passed the roadside apparatus 20, the display mode for the vehicle 10 and the roadside apparatus 20 is switched from the first mode to the second mode.

As described above, the information processing apparatus 30 according to the present embodiment stores information indicating the installation position and the detection area of each roadside apparatus. The information processing apparatus 30 monitors the positional information for each vehicle 10. The information processing apparatus 30 displays a map screen. When the vehicle 10 enters the detection area of the roadside apparatus 20, the information processing apparatus 30 displays the vehicle 10 and the roadside apparatus 20 on the map screen in the first mode.

According to such a configuration, when a specific situation occurs that the vehicle 10 has entered the detection area 51 of the roadside apparatus 20, the vehicle 10 and the roadside apparatus 20 are displayed on the map screen 50 in the first mode. Thus, an operator using the information processing apparatus 30 can recognize at a glance the vehicle 10 and the roadside apparatus 20 in this particular situation. Thus, according to the present embodiment, the technology for monitoring vehicles with communication functions is improved in that the operator can monitor the status of the vehicles 10 more efficiently compared to, for example, an example in which all vehicles 10 and all roadside apparatuses 20 are displayed on the map screen 50 at all times.

While the present disclosure has been described with reference to the drawings and examples, it should be noted that various modifications and revisions may be implemented by those skilled in the art based on the present disclosure. Accordingly, such modifications and revisions are included within the scope of the present disclosure. For example, functions or the like included in each component, each step, or the like can be rearranged without logical inconsistency, and a plurality of components, steps, or the like can be combined into one or a single component, step, or the like can be divided.

For example, an embodiment in which the vehicle 10 and/or the roadside apparatus 20 executes some or all of the operations that are executed by the information processing apparatus 30 in the above embodiment can be implemented. For example, the system 1 according to the above embodiment may be used to provide Mobility as a Service (MaaS), a service that leverages mobility.

In the embodiment described above, the vehicle 10 and the roadside apparatus 20 are displayed on the map screen 50 in the first mode or the second mode. However, instead of displaying the vehicle 10 and the roadside apparatus 20 in the second mode, an embodiment in which the vehicle 10 and the roadside apparatus 20 are not displayed or are hidden is also possible. Specifically, the controller 35 of the information processing apparatus 30 omits S103 described above. The controller 35 also hides the vehicle 10 and the roadside apparatus 20 in S107 above. According to such an embodiment, the vehicle 10 and the roadside apparatus 20 are displayed on the map screen 50 only in the specific situation where the vehicle 10 has entered the detection area 51 of the roadside apparatus 20. This makes it even easier for the operator to see the vehicle 10 and the roadside apparatus 20 in a particular situation, for example, in a situation where there are many vehicles 10 and roadside apparatuses 20 in the area displayed on the map screen 50. The "first mode" in the embodiment may be a mode in which the target vehicle 10 and roadside apparatus 20 are simply displayed.

In the embodiment described above, when the vehicle 10 enters the detection area 51 of the roadside apparatus 20, the information processing apparatus 30 may display the video captured by the roadside apparatus 20 in a third mode. Specifically, in S105 above, the controller 35 of the information processing apparatus 30 displays the vehicle 10 and the roadside apparatus 20 in the first mode, receives the videos captured by the roadside apparatus 20 from the roadside apparatus 20, and displays the videos on the map screen 50 in the third mode. The videos are, for example, real-time videos captured by the roadside apparatus 20, but are not limited to this example. According to such an embodiment, when a specific situation occurs where the vehicle 10 has entered the detection area 51 of the roadside apparatus 20, the video captured by the roadside apparatus 20 is displayed, thus allowing the operator to easily recognize the situation around the roadside apparatus 20.

Furthermore, the controller 35 may display the videos captured by each roadside apparatus 20 in the fourth mode, and when the vehicle 10 enters the detection area 51 of the roadside apparatus 20, the display mode for the video captured by the roadside apparatus 20 may be switched from the fourth mode to the third mode. Specifically, in S103 above, the controller 35 displays each vehicle 10 and each roadside apparatus 20 in the second mode, receives each video captured by each roadside apparatus 20 from each roadside apparatus 20, and displays the video in the fourth mode on the map screen 50. In S105 described above, the controller 35 displays the vehicle 10 and the roadside apparatus 20 in the first mode (i.e., switches from the second mode to the first mode) and also displays the video captured by the roadside apparatus 20 in the third mode (i.e., switches from the fourth mode to the third mode). In S107 described above, the controller 35 displays the vehicle 10 and the roadside apparatus 20 in the second mode (i.e., switches from the first mode to the second mode) and also displays the video captured by the roadside apparatus 20 in the fourth mode (i.e., switches from the third mode to the fourth mode).

Here, the video displayed in the third mode can be preferentially viewed by the operator compared to the video displayed in the fourth mode. Specifically, the fourth mode simply displays the target image, for example, whereas the third mode may display the image with more emphasis than the fourth mode, such as by making the outer frame of the target video blink. According to such an embodiment, when a specific situation occurs where the vehicle 10 has entered the detection area 51 of the roadside apparatus 20, the video captured by the roadside apparatus 20 is highlighted in comparison with the videos captured by other roadside apparatuses 20, thus allowing the operator to preferentially recognize the situation around the roadside apparatus 20.

In the embodiment described above, when the vehicle 10 enters the detection area 51 of the roadside apparatus 20, the information processing apparatus 30 may display pedestrian information detected from the video captured by the roadside apparatus 20. Specifically, the controller 25 of each roadside apparatus 20 detects pedestrian information from the captured video. Pedestrian information includes, for example, the number of detected pedestrians and the direction in which the pedestrians are moving (toward or away from the roadway, etc.), but is not limited to these examples and may include any information that can be detected from the video. The controller 25 transmits the pedestrian information to the information processing apparatus 30 via the communication interface 21. Upon determining that the vehicle 10 has entered the detection area 51 of the roadside apparatus 20 in S104 above, the controller 35 of the information processing apparatus 30 displays the vehicle 10 and the roadside apparatus 20 in the first mode and also displays the pedestrian information received from the roadside apparatus 20 on the map screen 50 in S105. According to such an embodiment, when a specific situation occurs where the vehicle 10 has entered the detection area 51 of the roadside apparatus 20, pedestrian information detected from the video captured by the roadside apparatus 20 is displayed, thus allowing the operator to recognize the situation around the roadside apparatus 20 in more detail.

In the embodiment described above, the detection area 51 of the roadside apparatus 20 is, for example, a circular area of a predetermined radius centered on the installation position of the roadside apparatus 20. However, the shape of the detection area 51 is not limited to this example. For example, consider the case where each roadside apparatus 20 is installed on the left side of the road relative to the travel direction of the lane in a country where driving on the left side of the vehicle 10 is required by law. In such a case, the detection area 51 of the roadside apparatus 20 may be shaped to extend from the installation position of the roadside apparatus 20 to a position a predetermined distance ahead along the lane.

In the embodiment described above, the information processing apparatus 30 monitors each vehicle 10 included in the system 1. In another embodiment, however, the information processing apparatus 30 may monitor only some of the vehicles 10 included in the system 1. Specifically, the controller 35 of the information processing apparatus 30 stores route information indicating the travel routes of each of the plurality of vehicles 10 included in the system 1 in the memory 34. The controller 35 identifies, among the plurality of vehicles 10, each vehicle 10 for which at least one roadside apparatus 20 is installed on the travel route, and each identified vehicle 10 is targeted for monitoring.

For example, an embodiment in which a general purpose computer functions as the information processing apparatus 30 according to the above embodiment can also be implemented. Specifically, a program in which processes for realizing the functions of the information processing apparatus 30 according to the embodiment are written is stored in a memory of a computer, and the program is read and executed by a processor of the computer. Accordingly, the present disclosure can also be implemented as a program executable by a processor, or a non-transitory computer readable medium storing the program.

The invention claimed is:

1. A method executed by a computer capable of communicating with one or more automated driving vehicles and one or more roadside apparatuses, the method comprising:

storing information indicating an installation position and a detection area of each of the roadside apparatuses;

receiving, from each of the automated driving vehicles, positional information for each of the automated driving vehicles detected by a position sensor of each of the automated driving vehicles;

displaying a map screen;

displaying each of the automated driving vehicles and each of the roadside apparatuses on the map screen in a second mode;

in response to a first automated driving vehicle among the automated driving vehicles entering a first detection area of a first roadside apparatus among the roadside apparatuses, switching a display mode for the automated driving vehicles and the roadside apparatuses from the second mode to a first mode which is different from the second mode;

displaying videos captured by each of the roadside apparatuses on the map screen in a fourth mode; and in response to the first automated driving vehicle entering the first detection area, switching a display mode for the videos from the fourth mode to a third mode which is different from the fourth mode, wherein in the second mode, each of the automated driving vehicles and each of the roadside apparatuses are not flickered on the map screen, in the first mode, the first automated driving vehicle and the first roadside apparatus are flickered on the map screen, while other automated driving vehicles and other roadside apparatuses are not flickered on the map screen, in the fourth mode, an outer frame of the video captured by each of the roadside apparatuses is not flickered on the map screen, and in the third mode, an outer frame of a first video captured by the first roadside apparatus is flickered on the map screen, while outer frames of other videos captured by the other roadside apparatuses are not flickered on the map screen.

2. The method according to claim 1, further comprising displaying pedestrian information detected from the first video captured by the first roadside apparatus in response to the first automated driving vehicle entering the first detection area.

3. The method according to claim 2, wherein the pedestrian information indicates a number of detected pedestrians and a direction in which each pedestrian is moving.

4. The method according to claim 1, further comprising:

in response to the first automated driving vehicle entering the first detection area, controlling the first roadside apparatus to output information indicating that the first automated driving vehicle is approaching.

5. The method according to claim 1, further comprising:

storing route information indicating a travel route of each of the automated driving vehicles, wherein the first automated driving vehicle is an automated driving vehicle for which at least the first roadside apparatus among the roadside apparatuses is installed on the travel route of the first automated driving vehicle.

6. The method according to claim 1, further comprising:

in response to the first automated driving vehicle having passed the first roadside apparatus, switching the display mode for the automated driving vehicles and the roadside apparatuses from the first mode to the second mode, and switching the display mode for the videos captured by the roadside apparatuses from the third mode to the fourth mode.

* * * * *